W. R. JACKSON.
Car Brake.

No. 18,150.   Patented Sept. 8, 1857

Witnesses:
H. H. Young
Chas. F. Stansbury

Inventor:
W. R. Jackson

UNITED STATES PATENT OFFICE.

W. R. JACKSON, OF BALTIMORE, MARYLAND.

AUTOMATIC RAILROAD-CAR BRAKE.

Specification of Letters Patent No. 18,150, dated September 8, 1857.

*To all whom it may concern:*

Be it known that I, W. R. JACKSON, of the city of Baltimore and State of Maryland, have invented an Improved Brake for Railroad-Cars, which is applicable also to other vehicles; and I do hereby declare the following to be a full and exact description of the same, reference being had to the accompanying drawings, in which—

Figure 1:
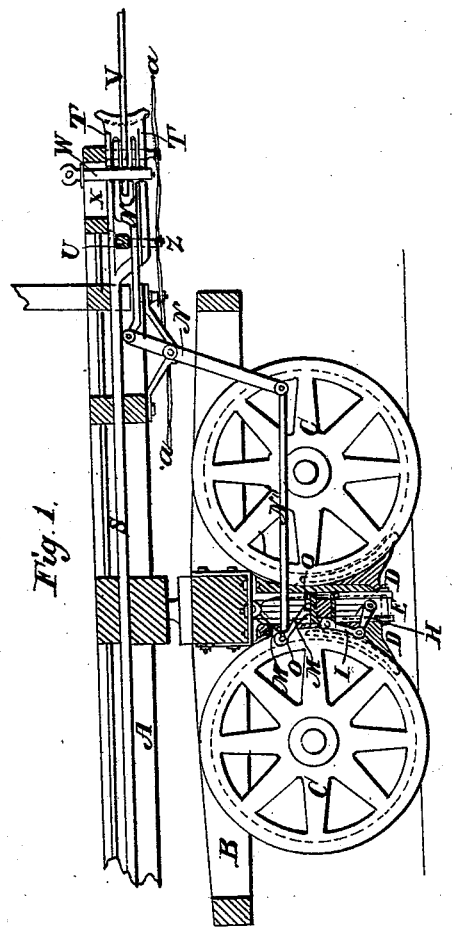
Figure 2:
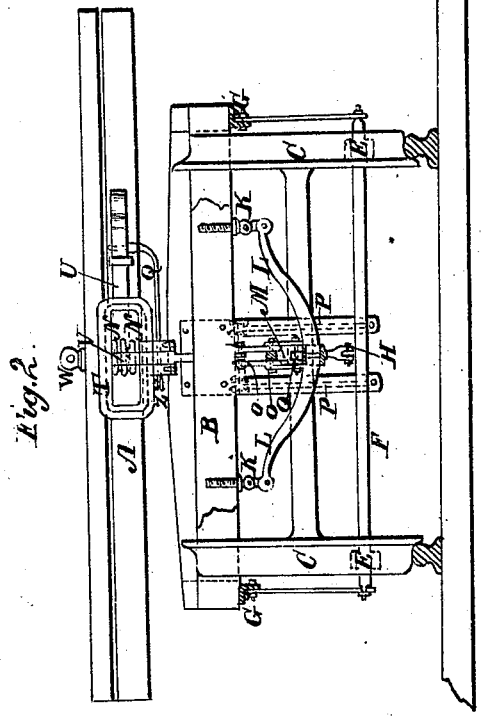
Figure 3:
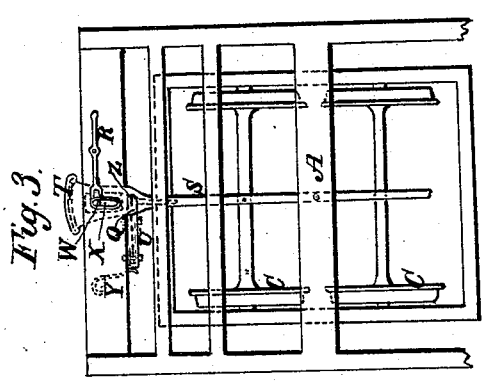
Figure 4:
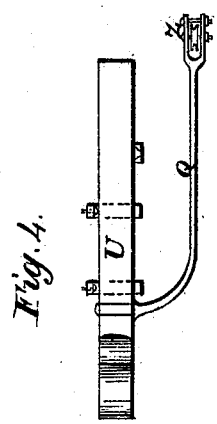

Figure 1, is a vertical longitudinal section of a car and truck frame with my improved brake attached; Fig. 2, is an end view of the same; Fig. 3, is a top view of the same; Fig. 4 is an enlarged view of the backing bolt with the spring, guides, &c.

The same part is indicated by the same letter of reference in all the figures.

The nature of my invention consists in the mode hereinafter described of arranging the actuating parts of the brake so that when the car is being drawn forward, the brakes shall be thrown out of action, and leave the wheels free to revolve; but when the tractive force ceases to be applied, the brakes will instantly be brought into action and check the speed of the train or vehicle.

To enable others skilled in the art to make and use my improved brake, I will proceed to describe its construction and operation, referring to the drawings by the letters of reference marked thereon.

A, represents the car frame—B, truck frame—C, car wheels—D brake blocks—E, cams for working brake blocks—F, cam rod—G, rod suspending cam-rod—H arm and lever for cam rod—I, lever connecting spring action with lever H—K, joints to give play to brake spring L—L, brake spring—M, toggle joint—N N′ N″, levers to work toggle joint M—o middle hinge of toggle joint M—P, braces and guides for spring L—Q, rod to work backing bolt U, by means of backing line a—R, lock lever for keeping brakes up when required—S, draft rod of car—T, bumper—U, backing bolt—V, coupling bar—W, coupling pin—X, slot for play of coupling pin—Y, spring to shoot backing bolt U, to its place—Z, pulley through which backing line a works—a, backing line.

The operation is as follows. When the train is at rest the central lever N′ is perpendicular, as also the toggle joint M, and the brake spring L is at its fullest extension, pressing by means of levers I and H the cams E against brake blocks D, and forcing them against the tread of the wheels—coupling pin W, being in the center of slot X, and brakes being down. When the locomotive goes ahead, the coupling pin W is drawn to the forward part of slot X, and the lever N, being connected, is drawn forward, and by the arm of levers N′ and N″, brings toggle joint M, to an angle, shortening spring L, which, through levers I and H, takes the spread of cams E from the brake blocks D, and so long as the locomotive pulls, brakes are up. It is evident, that as soon as the throttle valve of the locomotive is closed, the cars will crowd together, and consequently the brakes will be down. To prevent the brakes from going up backward, as the cars are still further compressed in the train, backing bolt U, is forced by its spring behind the shoulder of lever N, and keeps it from passing the center, consequently the reverse action cannot occur; but if the engineer desires to back his train, he has only to pull backing line a, which works through pulley Z, withdraws backing bolt U, and allows the shoulder of lever N to pass it, coupling pin W, working to extreme rear of slot X. The reverse action of the locomotive puts brakes up when backing. On going ahead again, backing bolt U is forced in rear of the shoulder of lever N, by means of spring Y.

Lock lever R, is intended to hold up the hinder brake of the last car in the train, or to keep up brakes when cars are to be moved by hand.

This brake, in connection with my improved coupler, is self-acting and requires no brakemen either for starting or putting brakes up or down. Its action is immediate, putting down instantly two brakes to each car, except the last one in the train, on which one only is worked, as the hindermost brake has to be kept up. The only manipulation required at all, is for the engineer to pull in a few feet of cord a extending along the train, when he wants to back.

The advantages of this brake are that brakemen are not needed at all, therefore life and property are independent of drunkenness, or inattention. It is not dependent on a continuous connection, as, if the coupling bar be broken, the brake on the detached portion of the train will be down at once, and it cannot descend an inclined plane, while that portion still attached to the engine goes ahead; consequently collision with a train behind on a grade is avoided. If any portion of the brakes are broken, the remainder still act.

The spring can be made to give any required pressure, hence it is capable of stopping a train in the shortest possible safe distance. In case of an obstruction on the road, the moment the engine encounters it, brakes are down; therefore a less number of cars are likely to run off the track, and less damage to be done. As all brake-blocks work by pressure, it is plain that this plan will act whether the blocks are between the wheels, over or behind them, by simply changing the position of the camrod lever. It is applicable, with slight modifications, to carriages and omnibuses.

The improved coupling herein described I do not claim under this application, as I have made a separate application, of even date herewith, for that part of the apparatus; but What I do here claim as my invention is—

The mode, herein before described, of controlling the action of the spring, or springs which bring the brake-blocks to bear upon the tread of the wheels, by the operation of the tractive force, or its suspension; so that the wheels shall be free when the vehicle is being drawn forwardly, or backed, and the brakes applied by the momentum of the train when the tractive, or the backing force is withdrawn.

The above specification signed and witnessed this twenty sixth day of May 1857.

W. R. JACKSON.

Witnesses:
H. H. YOUNG,
CHAS. F. STANSBURY.